US009916765B2

(12) United States Patent
Ishihara et al.

(10) Patent No.: US 9,916,765 B2
(45) Date of Patent: Mar. 13, 2018

(54) AIRCRAFT SYSTEMS AND METHODS FOR PROVIDING LANDING APPROACH ALERTS (71) Applicant: HONEYWELL INTERNATIONAL INC., Morris Plains, NJ (US)

(72) Inventors: Yasuo Ishihara, Kirkland, WA (US); Steve Johnson, North Bend, WA (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 65 days.

(21) Appl. No.: 14/932,492

(22) Filed: Nov. 4, 2015

(65) Prior Publication Data

US 2017/0124886 A1 May 4, 2017

(51) Int. Cl.
G06F 19/00 (2011.01)
G08G 5/02 (2006.01)
G01S 1/02 (2010.01)
G01S 1/08 (2006.01)
G08G 5/00 (2006.01)
G01S 13/91 (2006.01)

(52) U.S. Cl.
CPC ............... G08G 5/025 (2013.01); G01S 1/02 (2013.01); G01S 1/022 (2013.01); G01S 1/08 (2013.01); G01S 13/913 (2013.01); G08G 5/0021 (2013.01); G08G 5/0026 (2013.01); G08G 5/0073 (2013.01)

(58) Field of Classification Search
CPC .............................. G08G 5/025; G08G 5/0073
USPC ....................................................... 701/1, 16
See application file for complete search history.

(56) References Cited

U.S. PATENT DOCUMENTS

| 6,600,977 | B2 | 7/2003 | Johnson et al. | |
| 6,691,004 | B2 * | 2/2004 | Johnson | G01C 5/005 340/945 |
| 6,707,475 | B1 * | 3/2004 | Snyder | B64D 43/00 345/902 |
| 6,711,479 | B1 * | 3/2004 | Staggs | G08G 5/025 244/187 |
| 6,980,198 | B1 * | 12/2005 | Gyde | B64D 43/00 345/157 |

(Continued)

FOREIGN PATENT DOCUMENTS

EP    2511733 A2    10/2012

OTHER PUBLICATIONS

Taylor, J; Operation of Ground Proximity Warning System and Terrain Avoidance Warning System; Aeronautical Communications Panel (ACP) Twenty Fifth Meeting of Working Group F Dakar, Senegal Oct. 6-14, 2011.

(Continued)

Primary Examiner — Ronnie Mancho
(74) Attorney, Agent, or Firm — Lorenz & Kopf, LLP (57) ABSTRACT A method is provided for monitoring a landing approach of an aircraft. The method includes receiving instrument landing system (ILS) signals; determining a glideslope deviation from the ILS signals; disabling, when the glideslope deviation is less than a first predetermined threshold, at least one glideslope alert function; evaluating a current glideslope condition by comparing a designated glideslope angle to a glideslope check value; and re-enabling the at least one glideslope alert function when the glideslope check value differs from the designated glideslope angle by more than a second predetermined threshold.

20 Claims, 3 Drawing Sheets

(56) References Cited

U.S. PATENT DOCUMENTS

| | | | | |
|---|---|---|---|---|
| 7,024,287 | B2 * | 4/2006 | Peckham | G01C 21/20 701/3 |
| 7,366,591 | B2 * | 4/2008 | Hartmann | G05D 1/0607 340/945 |
| 7,463,954 | B1 * | 12/2008 | He | G01C 23/00 340/979 |
| 7,693,621 | B1 * | 4/2010 | Chamas | G08G 5/0021 340/951 |
| 7,852,236 | B2 * | 12/2010 | Feyereisen | G01C 5/005 340/945 |
| 7,941,251 | B2 | 5/2011 | Krogh et al. | |
| 8,344,303 | B2 * | 1/2013 | Elgersma | G01C 21/165 244/3.1 |
| 8,576,094 | B2 * | 11/2013 | Suddreth | G01C 23/00 340/972 |
| 8,630,756 | B2 | 1/2014 | Fleiger-Holmes et al. | |
| 8,781,654 | B2 * | 7/2014 | Giovannini | G08G 5/0021 701/1 |
| 8,897,934 | B2 * | 11/2014 | Meunier | G01S 13/94 701/9 |
| 8,949,011 | B2 * | 2/2015 | Ford | G01C 21/165 342/33 |
| 9,251,711 | B2 * | 2/2016 | Baillon | B64D 45/04 |
| 9,260,180 | B2 * | 2/2016 | Puyou | G05D 1/0676 |

OTHER PUBLICATIONS

Honeywell International Inc.; MK VI and MK VIII Enhanced Ground Proximity Warning System (EGPWS) Pilot's Guide; Rev. C—May 2004.

Extended EP Search Report for Application No. 16195385.6-1803 dated Mar. 24, 2017.

\* cited by examiner

AIRCRAFT SYSTEMS AND METHODS FOR PROVIDING LANDING APPROACH ALERTS

TECHNICAL FIELD

The present invention generally relates to aircraft systems and methods, and more particularly, to aircraft systems and methods for providing approach alerts during landing.

BACKGROUND

Landing is typically the most demanding aspect of flight. The landing operation is particularly difficult during low visibility or nighttime conditions. To improve safety, especially in low visibility or nighttime conditions, some airports and aircraft are equipped with an instrument landing system (ILS). Generally, an ILS includes one or more localizer and glideslope transmitters arranged on the ground that emit modulated signals that are received by corresponding receivers on the aircraft. From these signals, an aircraft controller generates horizontal and lateral guidance for implementation by the operator or an auto-pilot system. Although conventional ILS can provide improved safety and guidance for the landing operation, such systems are not infallible. For example, in some situations, the ILS of the aircraft may receive signals associated with a glideslope path of an incorrect runway or receive partial or disrupted signals associated with the correct runway.

Accordingly, it is desirable to provide systems and methods that improve safety during a landing approach, particularly in conjunction with ILS operation. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, a method is provided for monitoring a landing approach of an aircraft. The method includes receiving instrument landing system (ILS) signals; determining a glideslope deviation from the ILS signals; disabling, when the glideslope deviation is less than a first predetermined threshold, at least one glideslope alert function; evaluating a current glideslope condition by comparing a designated glideslope angle to a glideslope check value; and re-enabling the at least one glideslope alert function when the glideslope check value differs from the designated glideslope angle by more than a second predetermined threshold.

In accordance with another exemplary embodiment, a system is provided for monitoring a landing approach of an aircraft. The system includes an aircraft instrument landing system (ILS) configured to receive ILS signals and to calculate a glideslope deviation based on the ILS signals. The system further includes a glideslope warning unit coupled to the aircraft ILS and configured to selectively operate in at least one of a default mode with at least one glideslope alert function, a first mode in which the at least one glideslope alert function is disabled, or a second mode in which the at least one glideslope alert function is re-enabled. The system further includes a glideslope monitor coupled to the glideslope warning unit and configured to evaluate a current glideslope condition by comparing a designated glideslope angle to a glideslope check value. The glideslope warning unit is configured to operate in the first mode when the glideslope deviation is less than a first predetermined threshold and when a difference between the glideslope check value and the designated glideslope angle is within a second predetermined threshold. The glideslope warning unit is configured to operate in the second mode when the glideslope deviation is less than the first predetermined threshold and when the difference between the glideslope check value and the designated glideslope angle exceeds the second predetermined threshold.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments described herein provide improved systems and methods for providing proper alert during a landing approach. More specifically, the aircraft systems and methods monitor and evaluate a glideslope condition during an instrument landing system (ILS) operation, even when ILS guidance indicates that the glideslope angle deviation is minimal and a glideslope alert function has otherwise been disabled, particularly the excessive height glideslope alert function. Upon determining that the glideslope condition is inappropriate for the current situation, the systems and methods re-enable the glideslope alert function. As such, exemplary embodiments may provide necessary or desired warnings to an operator, even when operating according to ILS guidance, such as that may occur during a false glideslope capture event.

Figure 1:
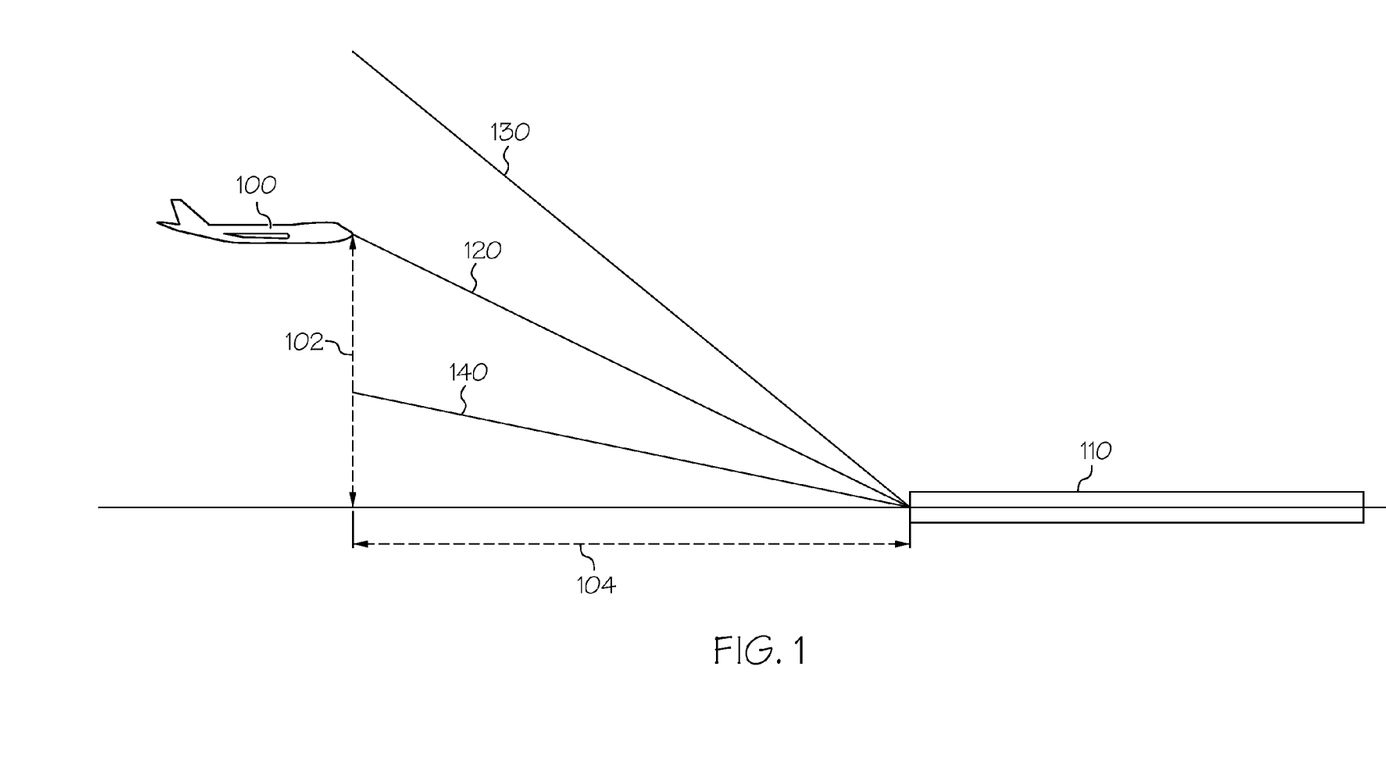
FIG. 1 is an exemplary environment for operation of an aircraft system in accordance with an exemplary embodiment.

FIG. 1 is an exemplary environment for operation of an aircraft 100 with an aircraft system 200 described in more detail with reference to FIG. 2. Generally, exemplary embodiments function during a landing approach of the aircraft 100 at a runway 110. Each runway 110 may have a designated approach or glideslope path 120 with an angle 122 that is appropriate for the particular runway and conditions. Typical glideslope angles may be 2.5°-3.5°, as examples. In the scenario shown in FIG. 1, the aircraft 100 has an altitude (or height) 102 and a distance from the runway 104 that results in aircraft 100 being on the correct glideslope path 120 at the correct glideslope angle 122. At times, the aircraft 100 may be too high (or at too steep an angle), as represented by the representative glideslope path 130, or too low (or at too low an angle), as represented by the representative glideslope path 140. Being on an inappropriate glideslope path may be a result of at least two situations. In a first situation, the aircraft 100 is receiving guidance associated with the glideslope path 120 corresponding to the intended runway 110 and the operator and/or auto-pilot system will attempt to intersect the correct glideslope path 120 according to predetermined procedures. In a second situation, the aircraft 100 may be receiving glideslope signal that is not designed for the approach. This situation may be referred to as a false glideslope capture event. Unless addressed, the operator of the aircraft 100 may not be aware that the aircraft 100 has captured the incorrect glideslope (e.g., glideslope paths 130, 140) and may be receiving inaccurate guidance. Exemplary embodiment described below address this issue.

Figure 2:
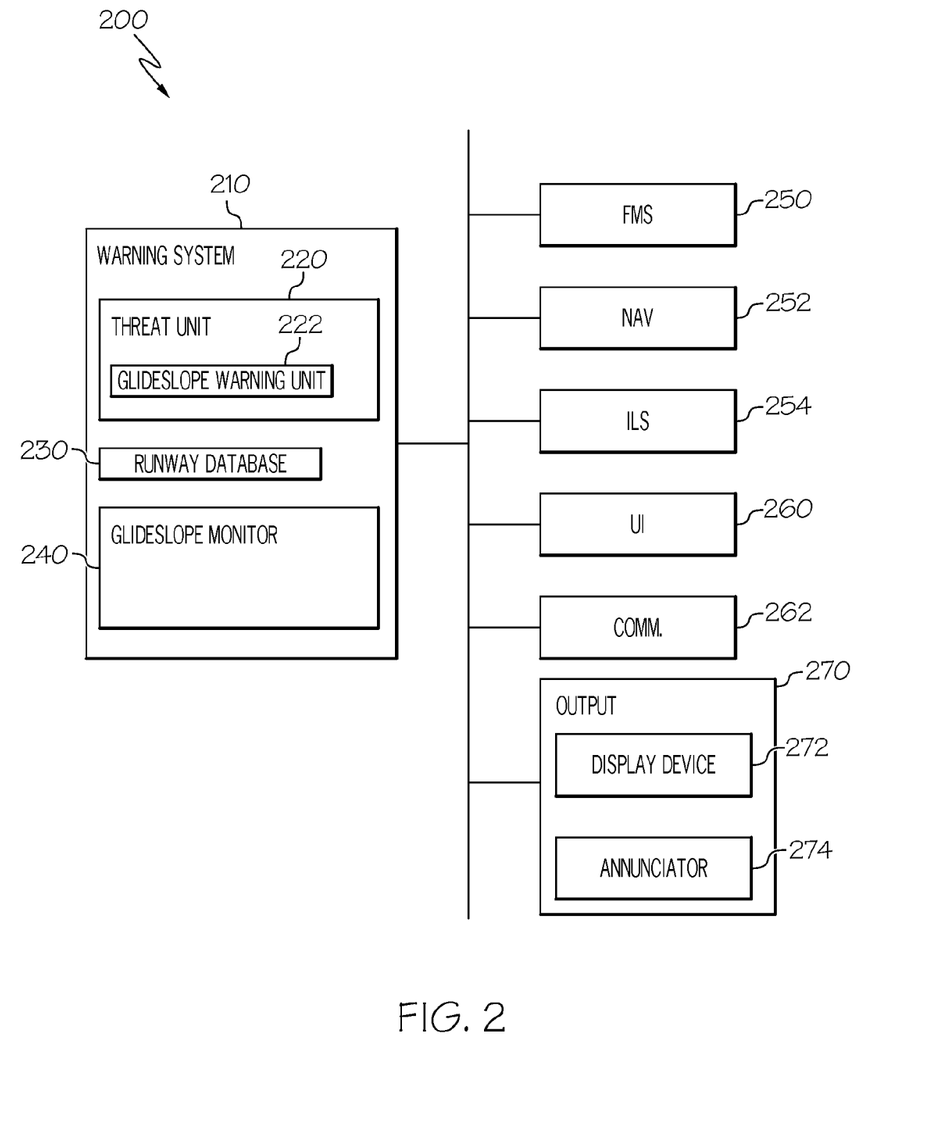
FIG. 2 is a functional block diagram of the aircraft system in accordance with an exemplary embodiment.

FIG. 2 is a block diagram of the aircraft system 200 in accordance with an exemplary embodiment. In one exemplary embodiment, the aircraft system 200 may operate in an aircraft environment such as that shown in FIG. 1. It should be understood that FIG. 2 is a simplified representation of the system 200 for purposes of explanation and ease of description. Further exemplary embodiments of the system 200 may include additional, other devices and components for providing further functions and features. The system 200 can be utilized in an aircraft, such as a helicopter, airplane, spacecraft, or unmanned vehicle. For simplicity, exemplary implementations are described below with reference to "aircraft."

As shown in FIG. 2, the system 200 includes a warning system 210, a flight management system 250, a navigation system 252, an instrument landing system (ILS) 254, a user interface 260, a communications unit 262, and one or more output devices 270 coupled together in any suitable manner, such with as a data bus. The components of the system 200 may communicate with one another in any suitable manner, such as an ARINC protocol. Although the system 200 appears in FIG. 2 to be arranged as an integrated system, the system 200 is not so limited and can also include an arrangement whereby one or more aspects of the system 200 are separate components or subcomponents of another system located either onboard or external to the aircraft.

Generally, the warning system 210 functions to provide aural and/or visual warnings of conditions when the aircraft is in a potentially hazardous flight condition relative to terrain or other aspect of the flight environment. The warning system 210 may be associated with or an subsystem of an enhanced ground proximity warning system (EGPWS). In one exemplary embodiment, the warning system 210 includes a threat unit 220, a database 230, and a glideslope monitor 240. More specific details about operation of the warning system 210 are provided below after a brief description of the components of the warning system 210 and the other components of the system 200.

As noted above, the warning system 210 includes a threat unit 220 that functions to identify and evaluate potential threats in the proximity of the aircraft. One of the threat situations monitored and evaluated by the threat unit 220 includes the parameters of the aircraft relative to an intended runway during the landing operation, including the speed, lateral position, and altitude relative to a designated glideslope path. As such, the threat unit 220 may include a glideslope warning unit 222 that generally evaluates the glideslope of the aircraft and generates appropriate warnings, as described in greater detail below. As an example, the glideslope warning unit 222 may include an excess height function that determines if the aircraft is too high relative to the glideslope path, and if so, generate the appropriate response.

The threat unit 220 may access or otherwise utilize data stored in a database 230. Database 230 can be a memory device (e.g., non-volatile memory, disk, drive, tape, optical storage device, mass storage device, etc.) that stores digital landing, waypoint, target location, and runway data as either absolute coordinate data or as a function of aircraft position that enables the consideration of a synthetic or enhanced representation of the aircraft operating environment. Database 230 can additionally include other types of navigation and/or operational information relating to the identification and evaluation of various types of threats. For example, database 230 may include safety margins or parameters that provide guidance for evaluating a flight situation, such as during a landing situation. Data in the database 230 may be uploaded prior to flight or received from external sources during flight. In some instances, runway data in database 230 may be obtained from airports, Runway Awareness and Advisory System (RAAS), and airport mapping database (AMDB). The runway data may include, for example, the position, location, length, altitude and gradient of the intended landing runway. In one exemplary embodiment, landing information is collected by sensors onboard the aircraft.

The warning system 210 further includes a glideslope monitor 240, specific details of which will be discussed in greater detail below. Generally, the glideslope monitor 240 functions to monitor the glideslope condition of the aircraft in particular scenarios, as also described in greater detail below. The threat unit 220 and/or glideslope monitor 240 may be embodied as one or more computer processors that generate commands based on algorithms or other machine instructions stored therein or in separate memory components. Depending on the embodiment, the threat unit 220 and/or glideslope monitor 240 may be implemented or realized with a general purpose processor, a content addressable memory, a digital signal processor, an application specific integrated circuit, a field programmable gate array, suitable programmable logic device, discrete gate or transistor logic, processing core, discrete hardware components, or any combination thereof. In practice, the threat unit 220 and/or glideslope monitor 240 include processing logic that may be configured to carry out the functions, techniques, and processing tasks or methods associated with operation of the system 200.

Generally, the flight management system 250 supports navigation, flight planning, and other aircraft control functions, as well as provides real-time data and/or information regarding the operational status of the aircraft. The flight management system 250 may include or otherwise access one or more of the following: a weather system, an air traffic management system, a radar system, a traffic avoidance system, an auto-pilot system, an auto-thrust system, a flight control system, hydraulics systems, pneumatics systems, environmental systems, electrical systems, engine systems, trim systems, lighting systems, crew alerting systems, electronic checklist systems, an electronic flight bag, and/or other suitable avionics systems. As examples, the flight management system 250 may identify operating states of the aircraft, such as engine operation and current aircraft configuration status, including information regarding the current flap configuration, aircraft speed, flight angle, aircraft pitch, aircraft yaw, aircraft roll, and the like. Additionally, the flight management system 250 may identify or otherwise determine environmental conditions at or near the current location of the aircraft, such as, for example, the current temperature, wind speed, wind direction, atmospheric pressure, and turbulence. The flight management system 250 may also identify optimized speeds, distance remaining, time remaining, cross track deviation, navigational performance parameters, and other travel parameters.

Among other functions, the navigation system 252 is configured to provide the warning system 210 with real-time navigational data and/or information regarding operation of the aircraft. The navigation system 252 may include or cooperate with a global positioning system (GPS), inertial reference system (IRS), Air-data Heading Reference System (AHRS), or a radio-based navigation system (e.g., VHF omni-directional radio range (VOR) or long range aid to navigation (LORAN)). The navigation system 252 is capable of obtaining and/or determining the current state of the aircraft, including the location (e.g., latitude and longitude), altitude or above ground level, airspeed, pitch, flight angle, heading, and other relevant flight information. Although not specifically shown, the flight management system 250 and/or navigation system 252 may be considered to include or otherwise receive information from one or more sensors. Such sensors may include various types of altitude sensors, attitude sensors, terrain sensors, and other types of ranging sensors.

Generally, the ILS 254 includes one or more components associated with the airport or landing site and one or more components associated with the aircraft. For example, the ILS 254 includes localizer and glideslope transmitters at the runway landing site that collectively form a highly directional transmitting arrangement. The ILS 254 further includes an aviation guidance system on the aircraft with a localizer receiver and a glideslope receiver configured to respectively receive signals from the localizer transmitters and the glideslope transmitters. The localizer and glideslope transmitters radiate an ILS signal modulated, for example, with two equal level, phase-locked, audio tones that have different levels at different points in the pattern, thereby creating an approach corridor decipherable by the localizer and glideslope receivers. As such, the aviation guidance system on the aircraft further includes a controller configured to process the signals received by the localizer and glideslope receivers and a display such as a course deviation indicator (CDI) configured to provide flight guidance information to the aircraft operator and/or an auto-pilot system, typically in the form of ILS deviation that depicts the discrepancy between the current and intended glideslope. In one exemplary embodiment, the ILS 254 may be considered part of the navigation system 252. Unless otherwise noted or indicated, the term "ILS" or aircraft ILS" used herein generally refers to the components of the ILS on the aircraft that receive and process ILS signals to generate ILS guidance.

Generally, the user interface 260 enables a user to interact with the various elements of the system 200. The user interface 260 may be realized as a keypad, touchpad, keyboard, mouse, touch panel, joystick, knob, line select key or another suitable device adapted to receive input from a user. In some embodiments, the user interface 260 may be incorporated into the display device 272, such as a touchscreen. In further embodiments, the user interface 260 is realized as audio input, such as a speaker, microphone, audio transducer, audio sensor, or the like.

The communications unit 262 may be any suitable device for sending and receiving information to and from the system 200. In some embodiments, communications unit 262 may be configured to receive radio frequency transmissions, satellite communication transmissions, optical transmissions, laser light transmissions, sonic transmissions or transmissions of any other wireless form of data link.

The system 200 also includes one or more output devices 270 that generally function to generate or implement warnings from the warning system 210. The output devices 270 may include, as examples, a display device 272 and an annunciator 274. The display device 272 may be any device or apparatus suitable for displaying various types visual warnings, including a visual written message and/or a flashing light, such as a cockpit display and/or warning bulbs. Similarly, the annunciator 274 may include any type of device for emitting an audible warning, such as a speaker.

Accordingly, the warning system 210 functions to at least receive and/or retrieve aircraft flight management information (e.g., from the flight management system 250), navigation and control information (e.g., from the navigation system 252), and landing, target and/or terrain information (e.g., from the database 230). As introduced above and discussed in further detail below, the warning system 210 additionally executes one or more algorithms (e.g., implemented in software) for identifying, calculating, and/or evaluating the glideslope angle of the aircraft, and as appropriate, take further steps based on the glideslope angle, including the generation of warnings on the output devices 270. As described below, the warning system 210 may enable and disable various alert functions based on the current flight situation and the operation of the ILS 254.

Figure 3:
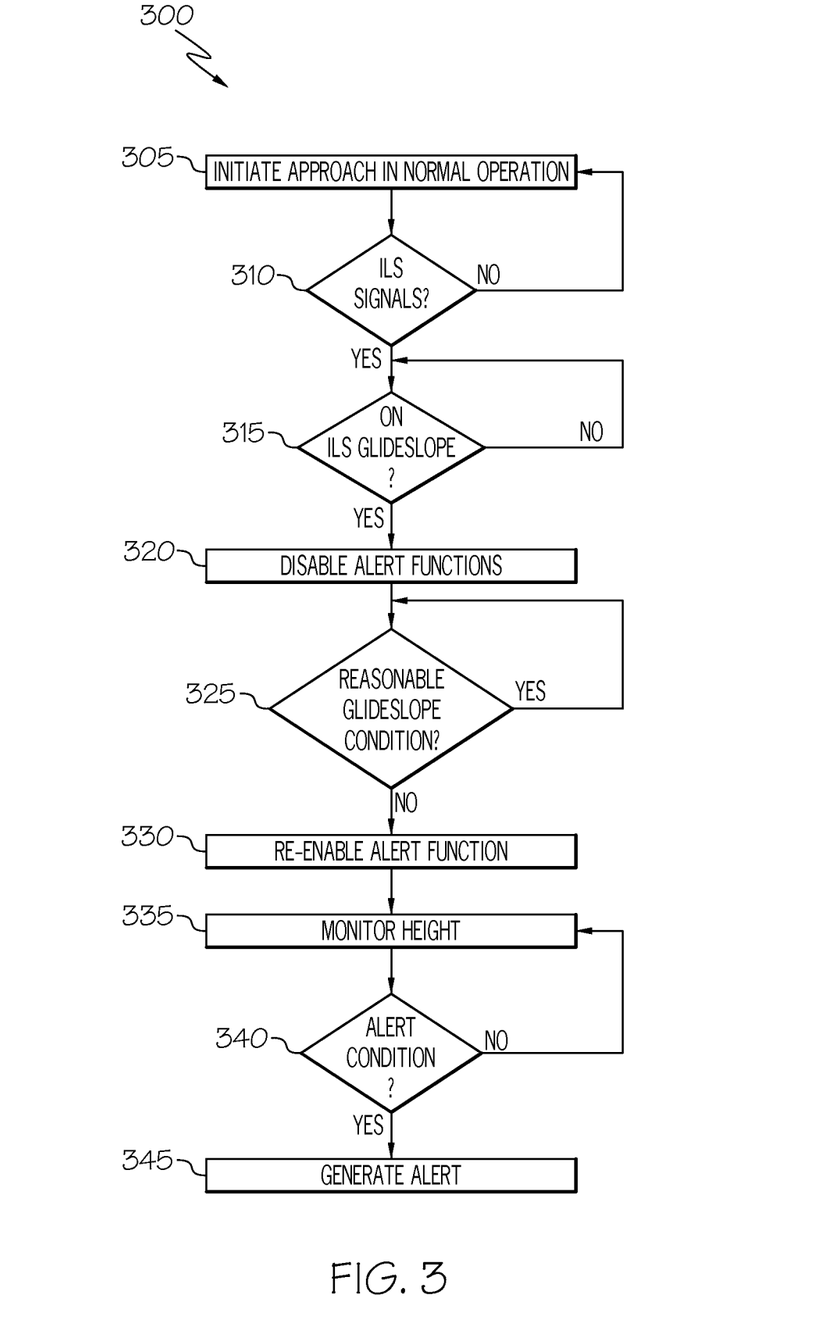
FIG. 3 is a flowchart of a method for providing aircraft landing approach alerts in accordance with an exemplary embodiment.

Additional aspects regarding the operation of the system 200 are discussed below in the description of the method of FIG. 3. FIG. 3 is flowchart of a method 300 for monitoring and, as appropriate, issuing alerts during a landing operation in accordance with an exemplary embodiment. The method 300 of FIG. 3 may be implemented with the system 200, and as such, FIG. 2 may be additionally referenced below in the discussion of FIG. 3. It should be appreciated that method 300 may include any number of additional or alternative tasks, and the tasks shown in FIG. 3 need not be performed in the illustrated order.

As noted above, the method 300 is generally implemented in a flight environment as the aircraft prepares to land. The method 300 may be automated such that, upon reaching a predetermined distance from the landing location, the method 300 is initiated. In another embodiment, the method 300 may be manually initiated by the aircraft operator.

In a first step 305 of the method 300, the system 200 initiates an approach in a default mode (or an "enabled mode") in which the warning system 210 generally has a normal operation. In particular, the glideslope warning unit 222 of the threat unit 220 functions to determine and evaluate the glideslope path of the aircraft based on data from, for example, the flight management system 250, navigation system 252, and database 230. As appropriate, the glideslope warning unit 222 operates with a glideslope alert function in which warnings are generated via the output devices 270 when the parameters of the aircraft relative to the glideslope path are inappropriate for the current situation. Such warnings may include visual and/or audible messages such as "TOO HIGH" or "TOO LOW". The threat unit 220 may additionally monitor and evaluate other types of threats.

In a second step 310 of the method 300, the system 200 determines if the ILS 254 on the aircraft is receiving ILS signals from the associated equipment on the ground in order to operate according to ILS guidance. If the system 200 is not receiving ILS signals, the method 300 returns to the initial step 305. If the system 200 is receiving ILS signals, the method 300 proceeds to step 315.

In step 315, the system 200 operates according to an ILS approach in which the operator (or an auto-pilot system) attempts to achieve an ILS glideslope based on guidance from the ILS signals. In particular, the ILS glideslope occurs when the current flight path angle is approximately equal to the guidance provided by the ILS signals. For example, the ILS glideslope is achieved when the ILS 254 indicates that the ILS deviation is approximately zero (or within a predetermined threshold) as determined based on the ILS signals received by the ILS 254. If, in step 315, the ILS deviation is approximately zero, the method 300 proceeds to step 320. However, if in step 315 the deviation is not approximately zero, the method 300 continues to repeat step 315 in order to achieve the ILS glideslope. Generally, the approach on ILS glideslope is considered a safe and accurate landing operation.

In step 320, the threat unit 220 disables one or more alert functions of the glideslope warning unit 222. As noted above, the ILS approach is generally considered desirable in that such guidance is typically very accurate. As such, functions of the glideslope warning unit 222 may be disabled in order to avoid "false" or "nuisance" alerts. Particularly, an excess height alert function is disabled, although generally, other alert functions associated with the threat unit 220 may also be disabled in such situations. Upon the disabling of the glideslope warning unit 222, the system 200 may be considered to be operating in a first mode (or a "disabled mode").

In step 325, the glideslope monitor 240 functions to monitor and evaluate the current glideslope condition of the aircraft. As described below, in effect, the glideslope monitor 240 determines when the ILS guidance may be inaccurate and/or the aircraft is following an inappropriate glideslope. The glideslope monitor 240 may determine and evaluate the current glideslope condition in any suitable manner, including the examples described below. In one exemplary embodiment, including the examples discussed below, the glideslope monitor 240 determines when the current glideslope angle is steeper (e.g., too high) or more shallow (e.g., too low) than appropriate, although other aspects of the glideslope condition may also be evaluated.

In one exemplary embodiment of step 325, the glideslope monitor 240 evaluates the current glideslope condition by comparing a designated glideslope angle against a glideslope check value. If the designated glideslope angle differs from the glideslope check value by more than a predetermined threshold, the method proceeds to step 330. If the designated glideslope angle is approximately equal to the glideslope check value (e.g., within the threshold or differs from one another by less than the threshold), the glideslope monitor 240 continues to evaluate the current glideslope condition in step 325.

The designated glideslope angle is generally considered an accurate or actual value of a glideslope angle associated with the respective runway. In one exemplary embodiment, the designated glideslope angle may be stored in a runway database, such as database 230, and retrieved by the glideslope monitor 240. Such angles may be set by the associated airport or government or industry regulations. In other embodiments, the designated glideslope angle may be considered approximately 2.5° or 3.5°, which correspond to typical values for a runway glideslope, even though some runways may have greater or lesser values.

The glideslope check value generally corresponds to a value that functions as an intended proxy for the current glideslope angle when the ILS deviation is close to zero. In effect, it provides a check on the current glideslope angle that is independent of ILS signals.

In one exemplary embodiment of step 325, the glideslope monitor 240 determines the glideslope check value by taking the arc tangent of aircraft height above the runway divided by the aircraft distance from runway threshold times feet per nautical mile, as represented by Equation (1):

$$GlideslopeCheckValue = \operatorname{ArcTan}\left(\frac{HeightAboveRunway}{(DistRunwayThreshold)*6076.11 \text{ ft/nm}}\right) \quad (1)$$

The height above the runway and the distance from the runway may be retrieved or otherwise received by the glideslope monitor 240 from the flight management system 250 and/or navigation system 252. Additional details about determining the glideslope angle may be provided in U.S. Pat. No. 6,600,977, which is hereby incorporated by reference.

In a further exemplary embodiment, the glideslope monitor 240 may consider the glideslope check value to be the current flight path angle. The current flight path angle may be provided to the glideslope monitor 240 by the flight management system 250 and/or navigation system 252. As noted above, when the ILS 254 indicates that the aircraft is on the glideslope (e.g., ILS deviation is approximately zero), the current flight path angle should be approximately equal to the glideslope angle such that, in this embodiment, the current flight path angle may function as a glideslope check value.

Depending on the current glideslope condition, the glideslope monitor 240 may provide instructions to modify the mode or operation of the glideslope warning unit 222. As noted above, if the glideslope check value is greater or less than the designated glideslope angle by more than a threshold amount (when the glideslope deviation indicated by the ILS 254 is approximately zero in step 315), it may indicate an issue and the method 300 may proceed to step 330, discussed in greater detail below. Specifically, it may indicate that the aircraft is not receiving accurate ILS signals. Examples of suitable thresholds may include 1° or 2°. If the glideslope check value is within the threshold, it may indicate that the aircraft is on the appropriate glideslope path and the method 300 may return to step 315.

In step 330, based on the output from the glideslope monitor 240, the warning system 210 re-enables one or more glideslope alert functions of the glideslope warning unit 222 of the threat unit 220 that were previously disabled in step 320. In particular, the warning system 210 may re-enable the excess height warning function of the glideslope warning unit 222. Upon the re-enabling of the excess height warning function of the glideslope warning unit 222, the system 200 may be considered to be operating in a second mode (or a "re-enabled mode"). In some embodiments, the glideslope monitor 240 may additionally generate a message to the user or other components of system 200 that the aircraft may be receiving inaccurate ILS signals.

In step 335, the glideslope warning unit 222 monitors the glideslope angle, particularly with respect to the excess height warning function. In step 340, the glideslope warning unit 222 of the threat unit 220 determines if the position and altitude of the aircraft are such that an alert condition exists. For example, the glideslope warning unit 222 may calculate an altitude for the current distance (or the current flight angle) relative to the runway, and if the aircraft is above or below the designated altitude or angle for the current distance, an alert may be generated. As such, the glideslope warning unit 222 may determine when the aircraft is "too high" or "too low" relative to the correct glideslope angle instead of merely relying upon the guidance from the ILS 254. If the current altitude is considered safe and appropriate for the flight condition and the designated glideslope path, the method 300 returns to step 335 and continues to monitor and evaluate. If the current altitude is too high and poses a potential threat to the aircraft, the method 300 proceeds to step 345.

In step 345, the threat unit 220 generates an alert via the output devices 270. As noted above, the alert may include a written or audible "TOO HIGH" or "TOO LOW" warning. Any suitable warning may be provided.

Accordingly, the exemplary embodiments discussed above provide improvements with respect to safety and efficiency relative to conventional systems and methods. In particular, exemplary embodiments evaluate the glideslope condition of the aircraft during a landing approach, even when the aircraft is flying according to ILS signals. Such an arrangement enables the disabling of certain types of alert functions to maintain efficiencies, while also preventing over-reliance on the ILS signals. For example, the chances of a nuisance (or false) alert when approaching a runway, particularly a recently constructed runway, is generally considered more likely that a false glideslope capture event in which such alerts are beneficial. As such, exemplary embodiments described above in which the alert function is disabled and re-enabled during certain conditions provides the advantages of both situations to avoid nuisance alerts while still providing an appropriate alert even during a false glideslope capture event, thereby increasing situational awareness and improving overall flight safety.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method for monitoring a landing approach of an aircraft, the method comprising:
   receiving instrument landing system (ILS) signals;
   determining a glideslope deviation from the ILS signals;
   disabling, with a processor controlling a glideslope warning unit and when the glideslope deviation is less than a first predetermined threshold, at least one glideslope alert function of the glideslope warning unit;
   evaluating, with the processor, a current glideslope condition by comparing a designated glideslope angle to a glideslope check value; and
   re-enabling, with the processor controlling the glideslope warning unit, the at least one glideslope alert function of the glideslope warning unit when the glideslope check value differs from the designated glideslope angle by more than a second predetermined threshold.

2. The method of claim 1, wherein the at least one glideslope alert function is an excess height alert function.

3. The method of claim 1, wherein the step of evaluating the current glideslope condition includes calculating the glideslope check value with the following equation:

$$GlideslopeCheckValue = ArcTan\left(\frac{HeightAboveRunway}{(DistRunwayThreshold) * 6076.11 \text{ ft/nm}}\right),$$

wherein
HeightAboveRunway is a current height of the aircraft above a respective runway in feet, and
DistRunwayThreshold is a current lateral distance of the aircraft from the respective runway in nautical miles.

4. The method of claim 1, wherein the step of evaluating the current glideslope condition includes determining a current flight path angle and using the current flight path angle as the glideslope check value.

5. The method of claim 1, wherein the step of evaluating the current glideslope condition includes retrieving the designated glideslope angle from a runway database.

6. The method of claim 1, wherein the step of evaluating the current glideslope condition includes setting the designated glideslope angle within a range of approximately 2.5° to 3.5°.

7. The method of claim 1, wherein the second predetermined threshold is approximately 2°.

8. The method of claim 1, wherein the second predetermined threshold is approximately 1°.

9. The method of claim 1, wherein the evaluating step includes identifying a false glideslope capture event when the glideslope check value differs from the designated glideslope angle by more than the second predetermined threshold.

10. A system for monitoring a landing approach of an aircraft, comprising:
    an aircraft instrument landing system (ILS) configured to receive ILS signals and to calculate a glideslope deviation based on the ILS signals;
    a glideslope warning unit coupled to the aircraft ILS and comprising a computer having a processor and a computer readable storage medium storing computer readable instructions capable of, upon execution by the processor, to selectively operate in at least one of
        a default mode with at least one glideslope alert function,
        a first mode in which the at least one glideslope alert function is disabled, or
        a second mode in which the at least one glideslope alert function is re-enabled; and
    a glideslope monitor coupled to the glideslope warning unit and configured to evaluate a current glideslope condition by comparing a designated glideslope angle to a glideslope check value,
    wherein the glideslope warning unit is configured to operate in the first mode when the glideslope deviation is less than a first predetermined threshold and when a difference between the glideslope check value and the designated glideslope angle is within a second predetermined threshold, and
    wherein the glideslope warning unit is configured to operate in the second mode when the glideslope deviation is less than the first predetermined threshold and when the difference between the glideslope check value and the designated glideslope angle exceeds the second predetermined threshold.

11. The system of claim 10, wherein the at least one glideslope alert function is an excess height alert function.

12. The system of claim 10, wherein the glideslope monitor is configured to calculate the glideslope check value with the following equation:

$$GlideslopeCheckValue = ArcTan\left(\frac{HeightAboveRunway}{(DistRunwayThreshold)*6076.11 \text{ ft/nm}}\right),$$

wherein
HeightAboveRunway is a current height of the aircraft above a respective runway in feet, and
DistRunwayThreshold is a current lateral distance of the aircraft from the respective runway in nautical miles.

13. The system of claim 10, wherein the glideslope monitor is configured to determine a current flight path angle and use the current flight path angle as the glideslope check value.

14. The system of claim 10, further comprising a runway database coupled to the glideslope monitor, wherein the glideslope monitor is configured to retrieve the designated glideslope angle from a runway database.

15. The system of claim 10, wherein the glideslope monitor is configured to set the designated glideslope angle within a range of approximately 2.5° to 3.5°.

16. The system of claim 10, wherein the second predetermined threshold is approximately 2°.

17. The system of claim 10, wherein the second predetermined threshold is approximately 1°.

18. The system of claim 10, wherein the glideslope monitor is configured to identify a false glideslope capture event when the glideslope check value differs from the designated glideslope angle by more than the second predetermined threshold.

19. The system of claim 10, wherein the glideslope warning unit, in the default mode and the second mode, is configured to initiate an excess height warning according to the at least one glideslope alert function when a current altitude exceeds a designated altitude for a current distance from a selected runway.

20. The system of claim 19, further comprising an output device coupled to the glideslope warning unit and configured to present the excess height warning to an operator.

* * * * *